(12) United States Patent
Klooster

(10) Patent No.: US 8,321,071 B2
(45) Date of Patent: *Nov. 27, 2012

(54) METHOD AND SYSTEM FOR VERTICAL NAVIGATION USING TIME-OF-ARRIVAL CONTROL

(75) Inventor: Joel Kenneth Klooster, Grand Rapids, MI (US)

(73) Assignee: GE Aviation Systems, LLC, Grand Rapids, MI (US)

( * ) Notice: Subject to any disclaimer, the term of this patent is extended or adjusted under 35 U.S.C. 154(b) by 631 days.

This patent is subject to a terminal disclaimer.

(21) Appl. No.: 12/533,161

(22) Filed: Jul. 31, 2009

(65) Prior Publication Data

US 2011/0029158 A1 Feb. 3, 2011

(51) Int. Cl.
*G01C 23/00* (2006.01)
(52) U.S. Cl. .............. 701/3; 701/7; 701/66; 701/121; 244/182
(58) Field of Classification Search .............. 701/3, 7, 701/20, 66, 121, 467; 244/11, 182; 340/441, 340/461; 455/16, 67.11
See application file for complete search history.

(56) References Cited

U.S. PATENT DOCUMENTS

| | | | |
|---|---|---|---|
| 4,536,843 A | 8/1985 | Lambregts | |
| 4,633,404 A | 12/1986 | Greeson et al. | |
| 4,709,336 A | 11/1987 | Zweifel | |
| 4,750,127 A | 6/1988 | Leslie et al. | |
| 4,764,872 A | 8/1988 | Miller | |
| 4,774,670 A | 9/1988 | Palmieri | |
| 5,051,910 A | 9/1991 | Liden | |
| 5,121,325 A | 6/1992 | DeJonge | |
| 5,408,413 A | 4/1995 | Gonser et al. | |
| 6,062,513 A | 5/2000 | Lambregts | |
| 6,266,610 B1 | 7/2001 | Schultz et al. | |
| 6,507,782 B1 | 1/2003 | Rumbo et al. | |
| 7,366,591 B2 | 4/2008 | Hartmann et al. | |
| 7,437,225 B1 | 10/2008 | Rathinam | |
| 8,010,267 B2 * | 8/2011 | Klooster et al. ............ | 701/66 |
| 2004/0078136 A1 | 4/2004 | Cornell et al. | |
| 2005/0283281 A1 | 12/2005 | Hartmann et al. | |
| 2005/0283306 A1 | 12/2005 | Deker | |
| 2007/0219679 A1 | 9/2007 | Coulmeau | |
| 2008/0195264 A1 | 8/2008 | Deker et al. | |
| 2008/0215196 A1 | 9/2008 | Deker | |
| 2008/0228333 A1 | 9/2008 | DeMenorval et al. | |
| 2008/0300738 A1 | 12/2008 | Coulmeau et al. | |
| 2008/0308681 A1 | 12/2008 | Wilson et al. | |
| 2009/0043434 A1 | 2/2009 | Deker | |
| 2009/0112454 A1 | 4/2009 | Wachenheim et al. | |
| 2009/0112535 A1 | 4/2009 | Phillips | |

* cited by examiner

*Primary Examiner* — Gertrude Arthur Jeanglaude
(74) *Attorney, Agent, or Firm* — David J. Clement, Esq.; Armstrong Teasdale LLP

(57) ABSTRACT

A method and systems for controlling a speed of a vehicle are provided. The control system includes an input device configured to receive a required time of arrival (RTA) at a waypoint and a processor communicatively coupled to said input device, said processor programmed to automatically determine a dynamically adjustable range for an autothrottle control using an RTA error and a speed control tolerance, the RTA error representing a difference between an estimated time of arrival (ETA) and the RTA, the speed control tolerance representing a tolerance range about the vehicle speed profile. The control system also includes an output device communicatively coupled to said processor, said output device is configured to transmit at least one of a thrust control signal and a drag control signal to a speed control system of the vehicle.

20 Claims, 3 Drawing Sheets

METHOD AND SYSTEM FOR VERTICAL NAVIGATION USING TIME-OF-ARRIVAL CONTROL

BACKGROUND OF THE INVENTION

The field of the invention relates generally to a vehicle time based management system, and more specifically, to a method and systems for vertical navigation using time-of-arrival control.

Conventionally, aircraft are controlled in three dimensions; latitude, longitude, and altitude. More recently, the ability to control aircraft in the fourth dimension, time, has been shown to enable advanced airspace management resulting in increased capacity. The use of time-based arrival management facilitates earlier landing time assignments and more efficient use of the runway. This also results in economic benefits if each aircraft can determine its desired landing time using its most fuel optimum flight profile. However, in the absence of a defined geometric descent profile current vertical navigation control algorithms use laws that control the elevators to a predetermined vertical path or vertical speed while maintaining a fixed throttle setting (typically idle). Using this control method the speed is allowed to fluctuate over a large range of values, resulting in varying and inaccurate Estimated Time-of-Arrivals (ETAs) at points downstream of the aircraft. This adversely impacts the aircraft's adherence to a time constraint, typically referred to as a Required Time-of-Arrival (RTA) or Controlled Time-of-Arrival (CTA).

An aircraft descent trajectory is typically constructed by an onboard Flight Management System (FMS) backward from the destination to the point where the descent begins—referred to as the Top of Descent (T/D). The vertical portion of this computed trajectory consists of three general portions:

1) Approach Segment—this is the lowest portion of the descent, and contains a deceleration to the final landing speed along with extensions of high-lift devices and landing gear.

2) Geometric Segment—this is the middle portion of the descent, and is computed as a geometric sequence of lines which attempt to honor all altitude constraints. This segment may not exist if there are no altitude constraints that require it.

3) Idle Segment—this is the upper portion of the descent, and is computed assuming the descent target speed and idle thrust. Estimated ("forecast") winds and temperatures are assumed in the computation of this segment.

When the aircraft is flying the idle segment of the trajectory, the throttle is fixed at an idle setting and an algorithm controls the elevators to the predefined vertical path guidance mode (VPATH). However, because estimated parameters (most notably winds and temperatures) are used in the computation of the vertical path, the speed of the aircraft will vary from the target speed used in the path computation if these estimated parameters are different than the actual values encountered.

A traditional vertical navigation strategy permits the actual airspeed to deviate from the target airspeed by some preset value (a typical value is 15 knots) before either raising the throttle setting (for actual airspeed below the target) or adding drag (either automatically or by prompting the flight crew) to zero the difference between actual airspeed and target airspeed. However, using such a large tolerance around the target speed before correcting the error makes a time constraint ahead of the aircraft very difficult to meet accurately. Moreover, when the actual and target airspeeds differ by this preset value and the control strategy is changed to zero this speed error, a large amount of thrust or drag will likely be required. A known alternative vertical navigation control strategy retains the idle thrust setting and uses the elevators to control the speed as long as the actual aircraft altitude is within some range of the specified vertical path position at the current lateral position. When the actual altitude deviates by more than this value, the control strategy is modified to regain the specified vertical path while maintaining the target speed. However, this method will also have a negative affect on the time-of-arrival control if the altitude band is too large as the ground speed (which directly affects time-of-arrival) is dependant not just on airspeed but also on altitude. Conversely, if the altitude band is too small the pitch of the aircraft may be continually varying, negatively impacting the comfort of the aircraft passengers.

BRIEF DESCRIPTION OF THE INVENTION

In one embodiment, a control system for controlling a speed of a vehicle includes an input device configured to receive a required time of arrival (RTA) at a waypoint and a processor communicatively coupled to the input device. The processor is programmed to automatically determine a dynamically adjustable speed control tolerance range for an autothrottle control using an RTA error and an RTA tolerance. The RTA error represents a difference between an estimated time of arrival (ETA) and the RTA. The speed control tolerance represents a tolerance range about the vehicle speed profile. The RTA tolerance represents a time accuracy requirement about the specified RTA. The control system also includes an output device communicatively coupled to the processor wherein the output device is configured to transmit at least one of a thrust control signal and a drag control signal to a speed control system of the vehicle.

In another embodiment, method of controlling aircraft speed during descent includes determining a required time of arrival (RTA) error along a track, wherein the RTA error represents a difference between an estimated time of arrival (ETA) and the RTA, determining a dynamically adjustable range of speed control tolerance using the RTA error, and controlling a speed of the aircraft using the RTA error and the speed control tolerance.

In yet another embodiment, a vehicle includes a propulsive engine configured to generate a commanded amount of thrust for moving the vehicle and a drag device coupled to the vehicle wherein the drag device is configured to control at least one of a drag profile of the vehicle and braking of the vehicle. The vehicle also includes an input device configured to receive a required time of arrival (RTA) at a waypoint and a control system communicatively coupled to at least one of the propulsive engine and the drag device. The control system includes a processor communicatively coupled to the input device wherein the processor is programmed to automatically determine a dynamically adjustable range for an autothrottle control using an RTA error and a speed control tolerance. The RTA error represents a difference between an estimated time of arrival (ETA) and the RTA. The speed control tolerance represents a tolerance range about the vehicle speed profile. The vehicle further includes an output device communicatively coupled to the processor wherein the output device is configured to transmit at least one of a thrust control signal to the propulsive engine and a drag control signal to the drag device.

BRIEF DESCRIPTION OF THE DRAWINGS

FIG. 1 is a schematic block diagram of a vehicle speed control system in accordance with an exemplary embodiment of the present invention;

FIG. 2 is a graph illustrating a speed error of a vehicle over time while transiting along a track; and FIG. 3 is a flow chart of a method of controlling the airspeed of an aircraft during a descent in accordance with an exemplary embodiment of the present invention.

DETAILED DESCRIPTION OF THE INVENTION

The following detailed description illustrates embodiments of the invention by way of example and not by way of limitation. It is contemplated that the invention has general application to systematic and methodical embodiments of controlling a vehicle in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
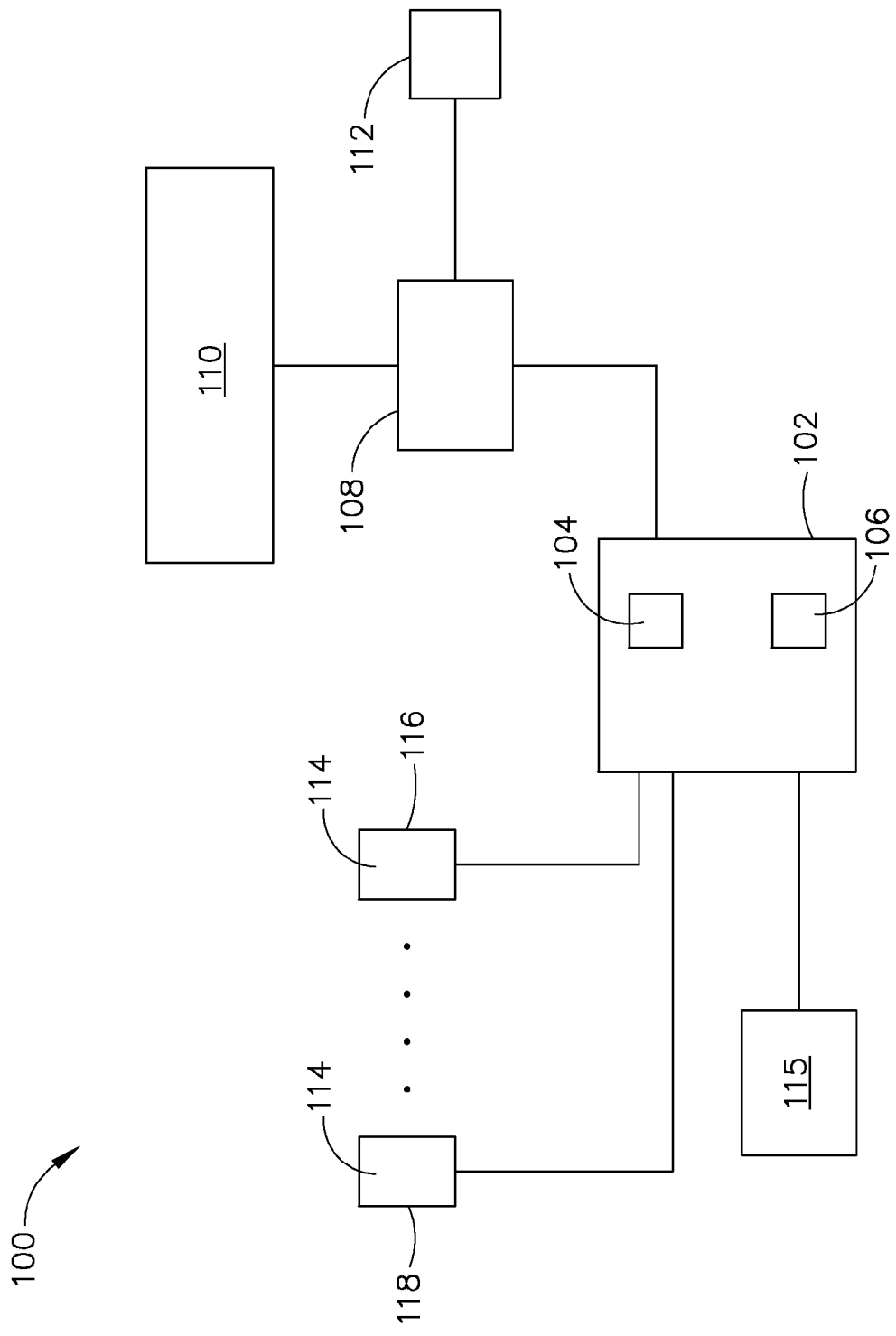
FIGS. 1-3 show exemplary embodiments of the method and apparatus described herein.

FIG. 1 is a schematic block diagram of a vehicle speed control system 100 in accordance with an exemplary embodiment of the present invention. In various embodiments, vehicle speed control system 100 may be part of a flight management system (FMS) (not shown). In various other embodiments, vehicle speed control system 100 may be a stand alone system. In the exemplary embodiment, vehicle speed control system 100 includes a controller 102 comprising a processor 104 communicatively coupled to a memory device 106. Controller 102 is communicatively coupled to a speed control system 108 configured to generate autothrottle signals to control a speed of a vehicle (not shown) using an engine 110 and/or a braking system 112. Controller 102 is configured to receive input signals from one or more input devices 114 or from other vehicle systems 115. Input devices 114 may include human input devices 116 and, for example, sensors 118 that provide signals related to a parameter of engine 110 or the vehicle. As used herein, human input devices 116 refers to computer devices that interact directly with humans such as, but not limited to, a keyboard, a mouse, a trackball, a touchpad, a pointing stick, a graphics tablet, a joystick, a driving or flight simulator device, a gear stick, a steering wheel, a foot pedal, a haptic glove, and a gestural interface.

During operation, processor 104 receives inputs from input devices 114, vehicle systems 115, and/or memory device 106 to generate signals to control the speed of the vehicle using engine 110 and/or braking system 112. The generated signals may be used to control the thrust of a gas turbine engine, torque and/or speed of an electric motor, or a power output of an internal combustion engine.

Figure 2:
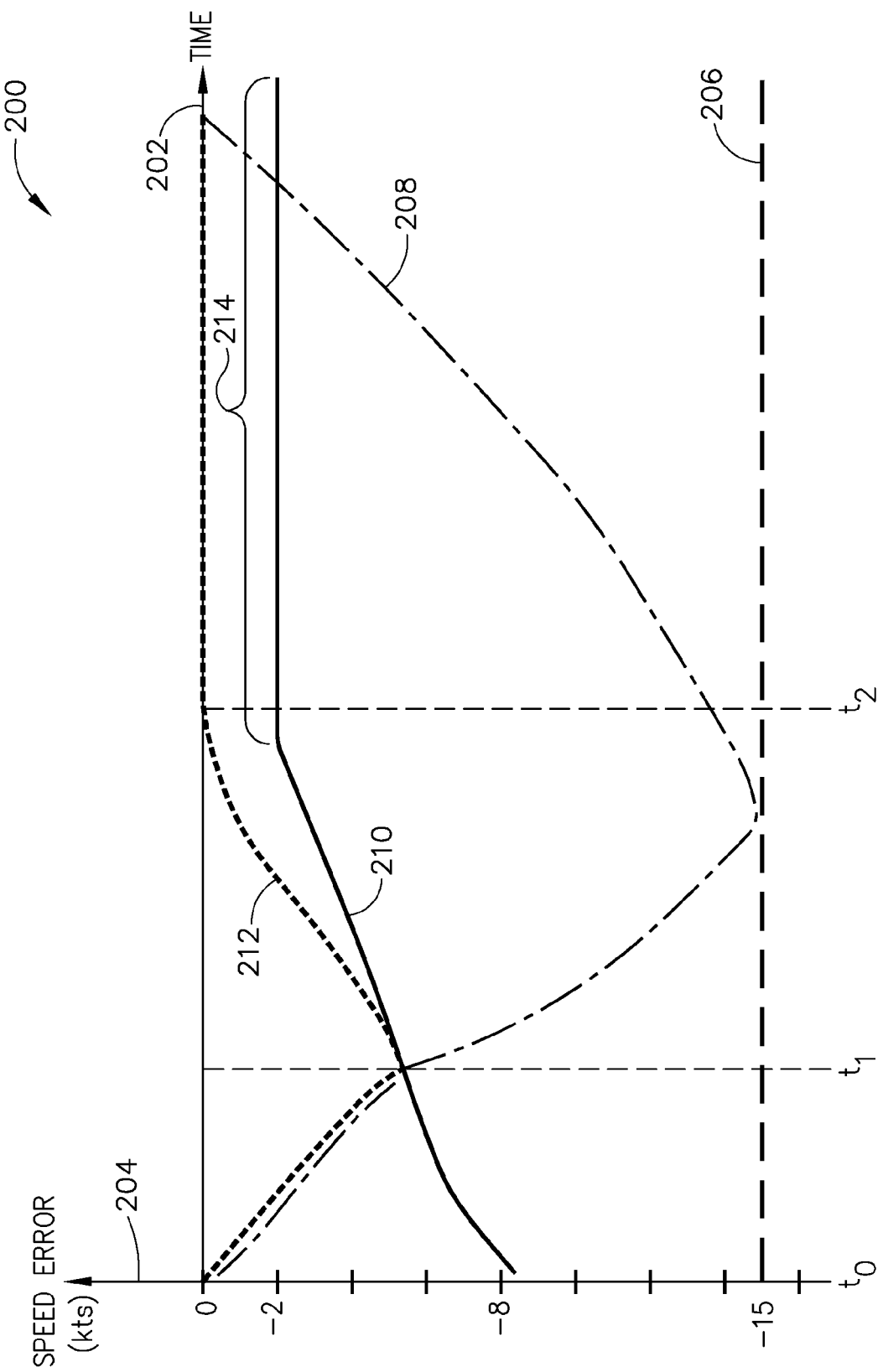

FIG. 2 is a graph 200 illustrating a speed error of a vehicle over time while transiting along a track. In the exemplary embodiment, graph 200 includes an x-axis 202 graduated in units of time and a y-axis 204 graduated in units of speed. A legacy speed error bound trace 206 illustrates the prior art speed error bound described above as a constant speed error value, in this example, fifteen knots. A legacy speed error trace 208 illustrates that in the prior art speed control systems, speed error is permitted to vary widely, in this case up to fifteen knots before corrective action is taken to adjust the vehicle speed to reduce the error. Graph 200 includes a speed error bound trace 210 that is determined in accordance with an exemplary embodiment of the present invention. The variable speed error bound permits closer control of vehicle speed to permit more accurate estimates of arrival at designated waypoints. A speed error trace 212 illustrates that the vehicle speed error is limited to a relatively smaller tolerance based on the dynamically adjustable vehicle speed error bound trace 210.

Embodiments of the present invention define a dynamically adjustable window for the autothrottle logic to change from an idle path descent to a speed mode, as well as for requesting additional drag or braking to decrease the vehicle speed. This dynamic window is a function of both the RTA error as well as the time-error tolerance, allowing better control to time. When the RTA mode is active, and the magnitude of the vertical deviation (aircraft altitude—desired vertical path altitude) is less than a predefined threshold value, the vertical navigation control logic sets the elevator control to the desired vertical path (VPATH) or vertical speed (VS), while the autothrottle is set as follows:

If deltaspeed >−Speed Control Tolerance
    autothrottle is set to idle
Else If deltaspeed <=−Speed Control Tolerance
autothrottle controls to speed until deltaspeed = $c_3$, where
    deltaspeed = actual_airspeed−target_airspeed
Speed Control Tolerance = max(minSpeedTol, $c_1$*ETA-RTA, −$c_2$*RTA Time Tolerance)
minSpeedTol is the minimum allowable speed error before adjusting throttle;
    and
$c_1$, $c_2$, $c_3$ are preset or time-adaptable positive constants Using this method, a minimum relatively smaller speed tolerance can be used to control the speed. However, if the RTA is predicted to be missed EARLY (so that ETA<RTA, or ETA−RTA<0) the second term in the Speed Control Tolerance equation allows the actual airspeed to be lower than the target speed by a larger amount, essentially allowing the aircraft to slow down more so that the magnitude of the EARLY error is reduced. The third term in the Speed Control Tolerance equation takes into account the tolerance of the RTA control, so that very tight speed control is not used when a large RTA error is acceptable. This method adapts the speed control in descent to the importance of the time control.

As shown in graph 200, there is initially at t0 an RTA error of about 16 seconds EARLY, resulting in a speed error bound of −8 knots. With the autothrottle in idle path descent mode, the difference between the actual airspeed and the target speed increases in the negative direction (i.e. the actual airspeed is below the target speed). Because the aircraft is flying slower than the target speed, the predicted time of arrival at the RTA waypoint gets later, resulting in the magnitude of the EARLY error decreasing (the ETA gets closer to the RTA). As the magnitude of the EARLY error decreases, the magnitude of the speed bound decreases as well. Eventually, at $t_1$ the speed error becomes equal to the control bound, at which point the autothrottle control switches to control to the target speed. This is represented by the speed error reversing direction and decreasing in magnitude approaching zero error at $t_2$. The magnitude of the RTA error is decreasing as well until the speed error control bound is limited by the minSpeedTol 214 (2 knots in FIG. 2). This can be contrasted with the legacy speed error control bound at −15 knots. With this constant legacy control bound, the magnitude of the speed error is allowed to increase significantly, resulting in a large time error accumulation before the autothrottle control switches to speed mode.

The adaptive speed control tolerance may also be used when the speed error is positive. The traces will be similar to mirror images of traces 210 and 212. In one embodiment, the autothrottle control algorithm switches automatically when the actual airspeed is greater than the target to create additional drag and slow the vehicle. In various other embodiments, the autothrottle control will not automatically switch when the actual airspeed is greater than the target, controller 102 can be programmed to prompt the crew to add drag in order to reduce airspeed. The legacy tolerance on speed error before issuing this prompt is also 15 knots. However, the message can be issued using the following logic:

---

If deltaspeed > Speed Control Tolerance
issue "MORE DRAG message" until deltaspeed <= $c_3$, where deltaspeed. Speed Control Tolerance, and $c_3$ are defined as above.

---

Figure 3:
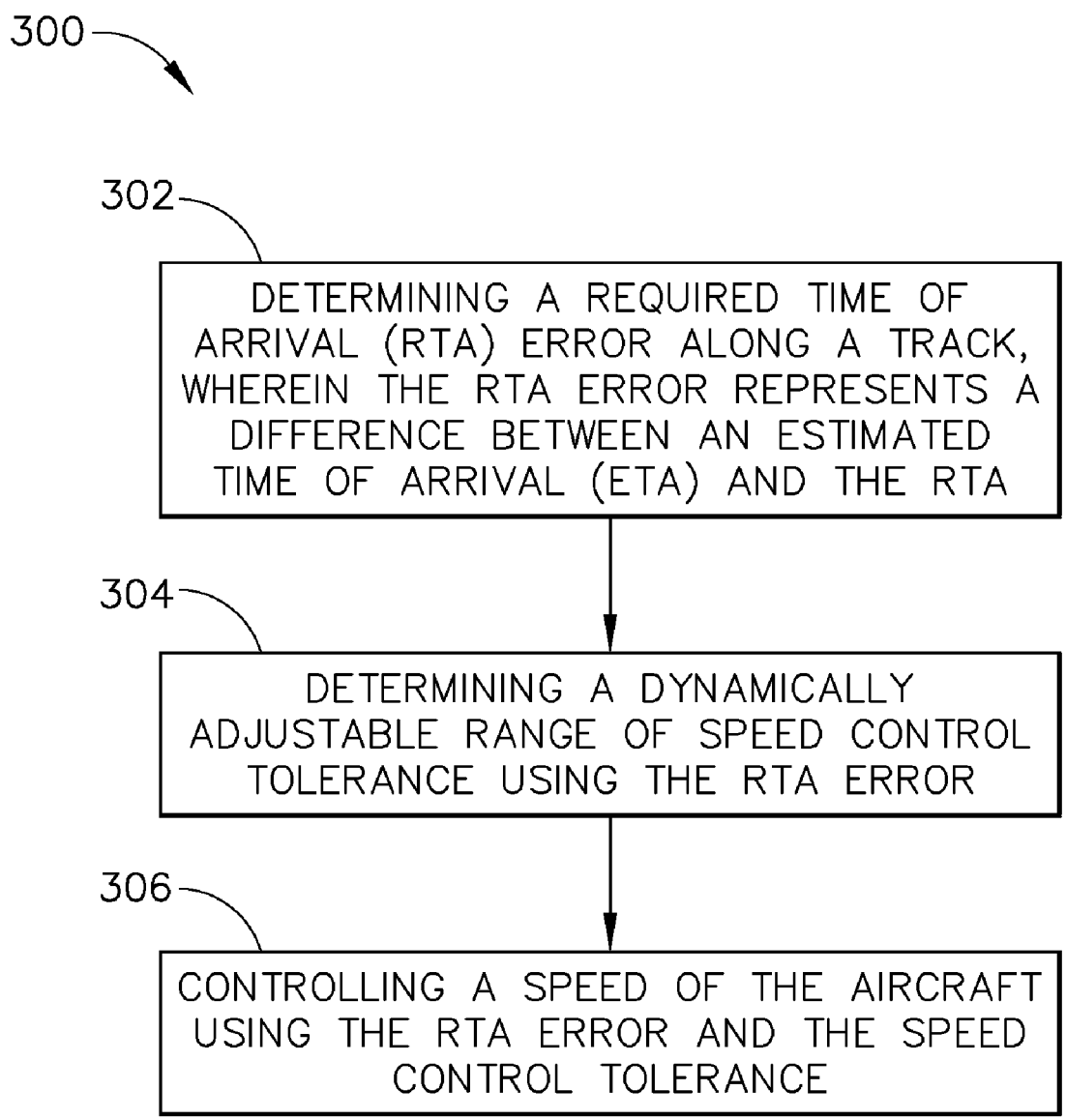

FIG. 3 is a flow chart of a method 300 of controlling the airspeed of an aircraft during a descent in accordance with an exemplary embodiment of the present invention. In the exemplary embodiment, method 300 includes determining 302 a required time of arrival (RTA) error along a track, wherein the RTA error represents a difference between an estimated time of arrival (ETA) and the RTA. Method 300 further includes determining 304 a dynamically adjustable range of speed control tolerance using the RTA error, and controlling 306 a speed of the aircraft using the RTA error and the speed control tolerance.

In one embodiment, determining the range of speed control tolerance is performed using:

---

Speed Control Tolerance=max(minSpeedTol, $c_1$*(ETA-RTA), $-c_2$*RTA Time Tolerance),
where
minSpeedTol represents the minimum allowable speed error before adjusting throttle or drag,
$c_1$*(ETA-RTA) represents a scaled RTA error; and
$-c_2$*RTA Time Tolerance represents a selectable minimum speed control tolerance selected for operational purposes.

---

In an embodiment, determining the dynamically adjustable range of speed control tolerance includes determining a range of allowed vehicle speed about a target vehicle speed. In various embodiments, controlling a speed of the aircraft includes increasing an amount of drag of the aircraft when the aircraft speed is greater than the Speed Control Tolerance and increasing an amount of thrust of an engine of the aircraft when the aircraft speed is less than the Speed Control Tolerance. When controlling the speed of the aircraft, the speed of the aircraft may be permitted to vary from the target vehicle speed by the determined speed control tolerance before adjusting at least one of engine thrust and aircraft drag.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 104, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is the capability to dynamically adjust the speed control tolerance for the autothrottle to take the current time control situation into account while maintaining the defined vertical profile. The smaller tolerance will result in more accurate time control, and will also result in smaller amounts of thrust needed when a correction does occur resulting in a smoother, more comfortable descent. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of a method and system of vehicle speed control provide a cost-effective and reliable means for dynamically adjusting the speed control tolerance for the autothrottle. More specifically, the methods and systems described herein facilitate maintaining the defined vertical profile. As a result, the methods and systems described herein facilitate automatically determining a dynamically adjustable speed error bound in a cost-effective and reliable manner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A control system for controlling a speed of a vehicle, said system comprising:
    an input device configured to receive a required time of arrival (RTA) at a waypoint;
    a processor communicatively coupled to said input device, said processor programmed to automatically determine a dynamically adjustable range for an autothrottle control using an RTA error and an RTA tolerance, the RTA error representing a difference between an estimated time of arrival (ETA) and the RTA, a speed control tolerance representing a time accuracy requirement about the received RTA; and
    an output device communicatively coupled to said processor, said output device is configured to transmit at least one of a thrust control signal and a drag control signal to a speed control system of the vehicle.

2. A control system in accordance with claim 1, wherein said processor is programmed to set the autothrottle control to idle when a difference between an actual airspeed and a target airspeed is greater than the speed control tolerance.

3. A control system in accordance with claim 1, wherein said processor is programmed to set the autothrottle control to control the vehicle speed when a difference between an actual airspeed and a target airspeed is less than or equal to the speed control tolerance.

4. A control system in accordance with claim 1, wherein said processor is programmed to set the autothrottle control to control the vehicle speed to a predetermined minimum speed.

5. A control system in accordance with claim 1, wherein the speed control tolerance represents a value that is the largest of a minimum speed tolerance, the RTA error scaled by a first factor, and an inverse of an RTA Time Tolerance scaled by a second factor.

6. A control system in accordance with claim 5, wherein said RTA Time Tolerance is selectable by a user.

7. A control system in accordance with claim 1, wherein said processor is programmed to select between an idle path descent mode and a speed control mode, wherein the idle path descent mode uses a pitch of the vehicle to control speed of the vehicle and wherein in the speed control mode uses at least one of engine thrust and deployable drag to control the speed of the vehicle.

8. A control system in accordance with claim 1, wherein said processor is programmed to control the autothrottle using:

--- if deltaspeed <=-Speed Control Tolerance
autothrottle controls to speed until deltaspeed = $c_3$
Where
deltaspeed = actual_airspeed-target_airspeed,
actual_airspeed represents the determined airspeed of the vehicle,
target_airspeed represents the determined airspeed the vehicle is controlled to maintain,
minSpeedTol represents the minimum allowable speed error before adjusting throttle or drag, and
$c_3$ represent a positive constant scaling factor.

---

9. A method of controlling a speed of an aircraft during descent comprising:
   determining a required time of arrival (RTA) error along a track, wherein the RTA error represents a difference between an estimated time of arrival (ETA) and the RTA;
   determining a dynamically adjustable range of speed control tolerance using the RTA error; and
   controlling a speed of the aircraft using the RTA error and the speed control tolerance.

10. A method in accordance with claim 9 wherein determining a dynamically adjustable range of speed control tolerance using the RTA error comprises determining the range of speed control tolerance using:

---

Speed Control Tolerance=max(minSpeedTol, $c_1$*(ETA-RTA), $-c_2$*RTA Time Tolerance),
   where
      minSpeedTol represents the minimum allowable speed error before adjusting throttle or drag,
      $c_1$*(ETA-RTA) represents a scaled RTA error; and
      $-c_2$*RTA Time Tolerance represents a selectable minimum speed control tolerance selected for operational purposes.

---

11. A method in accordance with claim 9 wherein controlling a speed of the aircraft comprises increasing an amount of drag of the aircraft when the aircraft speed is greater than the Speed Control Tolerance.

12. A method in accordance with claim 9 wherein controlling a speed of the aircraft comprises increasing an amount of thrust of an engine of the aircraft when the aircraft speed is less than the Speed Control Tolerance.

13. A method in accordance with claim 9 wherein determining a dynamically adjustable range of speed control tolerance using the RTA error comprises determining a range of allowed vehicle speed about a target vehicle speed.

14. A method in accordance with claim 13 wherein controlling a speed of the aircraft comprises permitting the speed of the aircraft to vary from the target vehicle speed by the determined speed control tolerance before adjusting at least one of engine thrust and aircraft drag.

15. A method in accordance with claim 13 wherein controlling a speed of the aircraft comprises adding at least one of thrust and drag to the aircraft when the speed of the aircraft is outside the determined speed control tolerance.

16. A vehicle comprising:
   a propulsive engine configured to generate a commanded amount of thrust for moving the vehicle;
   a drag device coupled to the vehicle, said drag device configured to control at least one of a drag profile of the vehicle and braking of the vehicle;
   an input device configured to receive a required time of arrival (RTA) at a way/point;
   a control system communicatively coupled to at least one of said propulsive engine and said drag device, said control system comprising a processor communicatively coupled to said input device, said processor programmed to automatically determine a dynamically adjustable range for an autothrottle control using an RTA error and an RTA tolerance, the RTA error representing a difference between an estimated time of arrival (ETA) and the RTA, the speed control tolerance representing a time accuracy requirement about the specified RTA; and
   an output device communicatively coupled to said processor, said output device is configured to transmit at least one of a thrust control signal to said propulsive engine and a drag control signal to said drag device.

17. A vehicle in accordance with claim 16, wherein said processor is programmed to set the autothrottle control to idle when a difference between an actual airspeed and a target airspeed is greater than the speed control tolerance.

18. A vehicle in accordance with claim 16, wherein said processor is programmed to set the autothrottle control to control the vehicle speed when a difference between an actual airspeed and a target airspeed is less than or equal to the speed control tolerance.

19. A vehicle in accordance with claim 16, wherein said processor is programmed to set the autothrottle control to control the vehicle speed to a predetermined minimum speed.

20. A vehicle in accordance with claim 16, wherein the speed control tolerance represents a value that is the largest of a minimum speed tolerance, the RTA error scaled by a first factor, and an inverse of an RTA Time Tolerance scaled by a second factor.

* * * * *